UNITED STATES PATENT OFFICE.

THOMAS LATHAM BOOTE AND RICHARD BOOTE, OF BURSLEM, ENGLAND.

IMPROVEMENT IN THE MANUFACTURE OF POTTERY AND SUCH LIKE WARES.

Specification forming part of Letters Patent No. 51,123, dated November 21, 1865.

*To all whom it may concern:*

Be it known that we, THOMAS LATHAM BOOTE, and RICHARD BOOTE, of Burslem, in the county of Stafford, Kingdom of Great Britain and Ireland, potters, have invented certain new and useful Improvements in the Manufacture of Pottery and such like wares; and we do hereby declare the following to be a full, clear, and exact description of the same—that is to say, Our invention consists in manufacturing plates, saucers, dishes, bowls, and other similar dished and concave articles from pulverized clay or such like material in a dry or partially-dry state, in manner hereinafter mentioned.

We take a metal mold, made in two parts and of the shape of the article to be manufactured, one part of the mold to give form to or shape the outside and the other part the inside of the article. For some articles it will be necessary to make the mold in more than two parts. We fill the lower part of the mold with pulverized clay or other material from which the article is to be manufactured, and if this lower part is intended to give shape to the outer or convex side of the article we remove a part of the clay or other material, leaving that which remains to correspond as near as possible with the inner or concave side of the article. If on the other hand the lower part of the mold is intended to give shape to the inner or concave side of the article, we leave the clay to correspond as near as possible with the outer or convex side. We then lower the upper part of the mold into or upon the lower part, and after exerting sufficient pressure again raise it, and the article may be removed. By shaping, or partially shaping, the clay, as before explained, before bringing down the upper part of the mold, the article receives uniform pressure at every part.

Having now described the nature of our said invention and in what manner the same is to be performed, we declare that we claim as our improvements in the manufacture of pottery and such like wares—

Arranging the clay or other material employed in or on the molds in such manner that in making articles of a concave and convex form each part may receive an equal amount of pressure, substantially as hereinbefore described.

In testimony whereof we have signed our names to this specification in the presence of two subscribing witnesses.

T. L. BOOTE.
    RICHARD BOOTE.

Witnesses:
 ARMST. FITZ GERALD,
  *Burslem, Bookkeeper,*
 FREDERICK OWEN,
  *Burslem, Writing-Clerk.*